Jan. 15, 1963 R. H. HAVERKAMP 3,073,102
SELF-PROPELLED RAKING MACHINE
Filed Nov. 8, 1960 3 Sheets-Sheet 1

Reinhard H. Haverkamp
INVENTOR.

BY *[signatures]*
Attorneys

Jan. 15, 1963  R. H. HAVERKAMP  3,073,102
SELF-PROPELLED RAKING MACHINE
Filed Nov. 8, 1960  3 Sheets-Sheet 3

Reinhard H. Haverkamp
INVENTOR.

United States Patent Office 3,073,102
Patented Jan. 15, 1963

3,073,102
SELF-PROPELLED RAKING MACHINE
Reinhard H. Haverkamp, P.O. Box 1113, Riesel, Tex.
Filed Nov. 8, 1960, Ser. No. 67,991
6 Claims. (Cl. 56—377)

This invention relates to a raking machine and more particularly to a power driven side delivery raking machine. The machine is particularly useful for raking hay, grain, straw, etc.

It is conventional practice to construct raking machines without any built-in power propelling means. Consequently, in order to use these machines, it is necessary to have the machines towed by separate tractor. Since tractors are very expensive items, it is an object of this invention to provide a raking machine which has a built-in power source for propelling the machine whereby the machine is completely self-sufficient and does not require any tractor or towing means. The elimination of the tractor results in a considerable saving.

It is another object of this invention to provide a raking machine which does not slip or slide in heavy hay because it is self-propelled.

Another object of the invention is to provide a self-propelled hay raking machine which is considerably more maneuverable, can be turned sharper and operated in smaller spaces than the conventional towed raking machine.

Still another object of the invention is to provide a self-propelled raking machine which is simple in design, economical to manufacture, and maintain and easier to operate and more efficient in operation than the conventional pull-type rake. It is contemplated that commercialization of this self-propelled rake will result in substantial savings to farmers throughout the country.

Still another object of the invention is to provide a self-propelled rake wherein only the front wheels of the machine are forward of the rake whereby only these wheels run over the hay or grain during the raking operation. In the operation of the conventional towed rake, not only do the front wheels of the rake themselves run over the hay, but also the four wheels of the tractor roll over it before it is raked. By having only two wheels run over the hay, less hay and grain is lost or destroyed.

Still another object of the invention is to provide a raking machine, wherein the rake itself is completely power operated.

Still another object of the invention is to provide a self-propelled raking machine which uses less fuel and requires not as much maintenance as conventional towed raking machines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
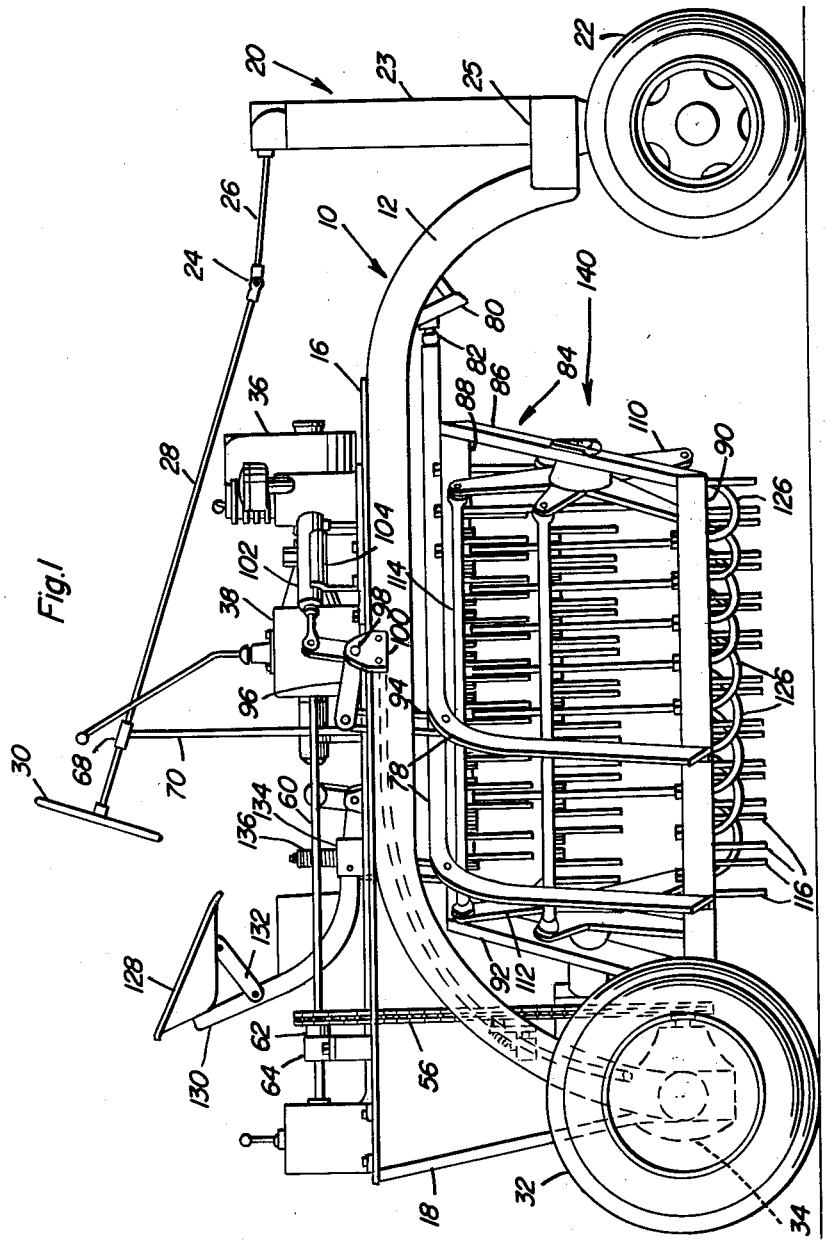
FIGURE 1 is a side elevational view of the self-propelled raking machine.
Figure 2:
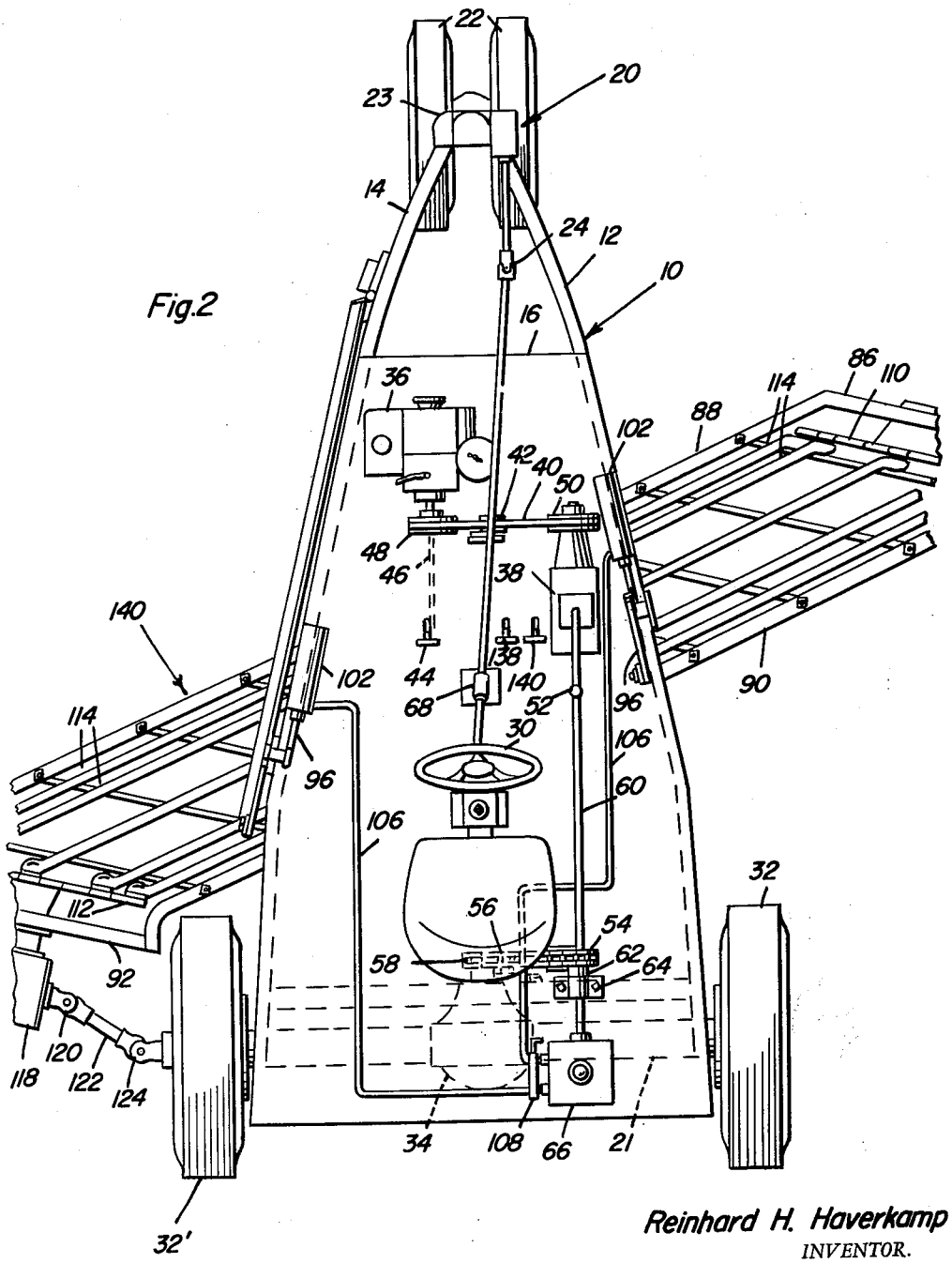
FIGURE 2 is a plan view of the same machine.
Figure 3:
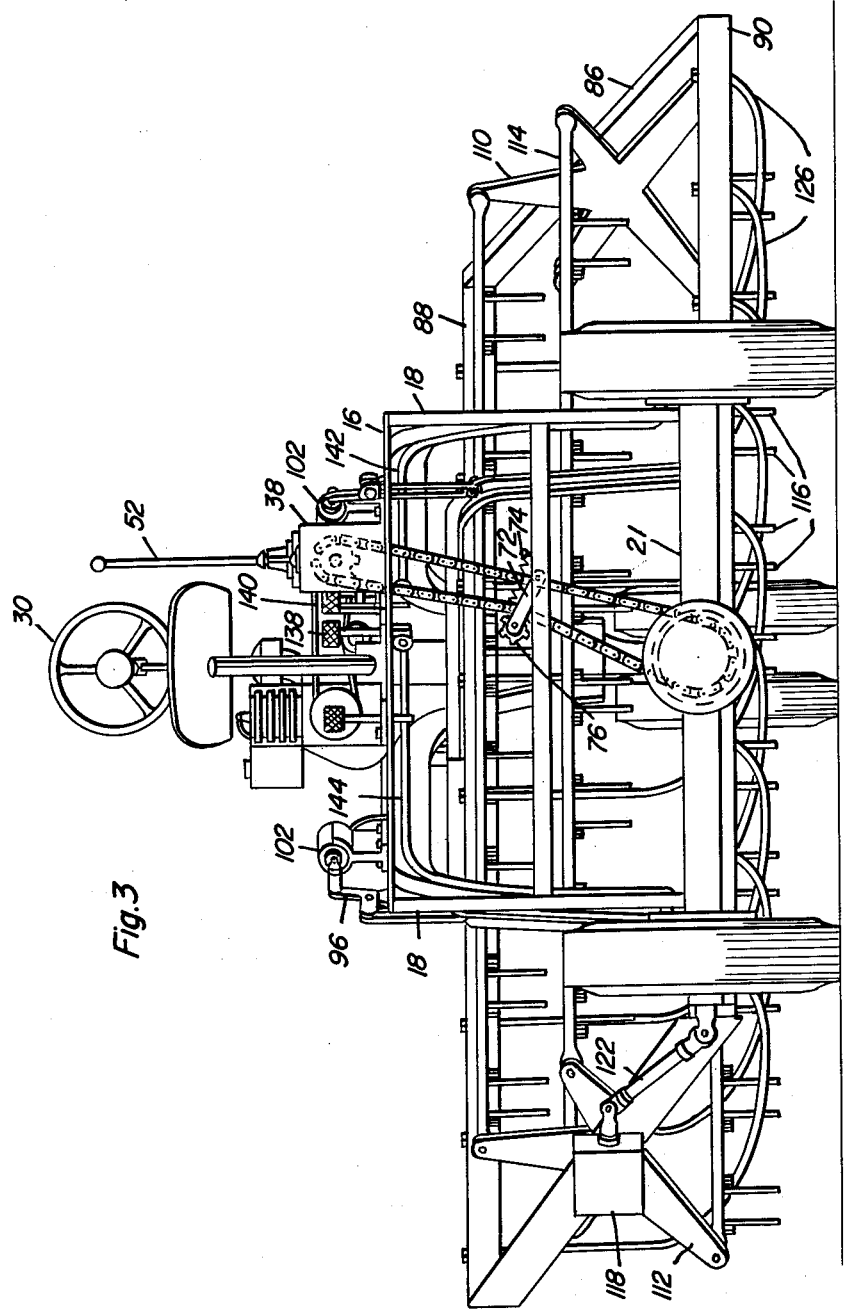
FIGURE 3 is a rear end view in elevation of the machine.

Referring to FIGURES 1 and 2, the parts of the machine are supported on two substantially U-shaped frame members 12 and 14 which converge close together at the front of the machine and are substantially spaced at the rear of the machine. The top portion of the frame members are rigidly joined together by the floor plate 16. As shown in FIGURE 1, the floor plate 16 extends rearwardly beyond the frame member and is supported at its extreme rear end by strut members 18 which are connected to the axle housing 21.

The front end of the machine comprises a wheel and steering unit 20 similar to that employed on John-Deere tractors. The unit 20 comprises the two front wheels 22 supported on and steered by a steering unit 23. The steering unit 23 is connected to the steering wheel 30 by means of a two-piece shaft 26, 28 connected by universal joint 24. The unit 20 is connected to the frame members 12 and 14 by flanges 25 which may be welded or bolted to the frame and steering unit.

The rear end of the frame members 12 and 14 are connected to and integrally secured to the axle housing 21 which in turn is fixed to the conventional differential housing 34.

The power plant of the self-propelled rake comprises a Wisconsin or other brand air cooled engine 36 which is secured to the forward portion of the floor plate 16. The engine 36 is connected to a conventional shift lever type transmission 38 by means of a V-belt 40. The V-belt 40 is normally tightened by an idler pulley 42 which is urged upwardly into engagement with the lower portion of the belt by means of a spring, not shown. For releasing the belt drive, clutch pedal 44 is provided, and when it is pushed downwardly it operates the lever or rod 46 under the floor 16 which in turn is connected to the idler pulley 42 for releasing it from the belt. This permits the belt to slip so that no power will be transmitted from the engine pulley 48 to the driven pulley 50.

The transmission 38 drives a shaft 60 which is rotatable in a bearing 62 clamped to the floor plate by means of an arcuate clamp 64 and bolt. Fixed to the shaft adjacent the bearing 62, is a drive sprocket 54, and the end of the drive shaft 60 is fixed to a driven pump 66. The sprocket 54 drives the differential drive shaft by means of a chain 56 and a sprocket 58 fixed to the end of the differential drive shaft.

The steering shaft 28 is rotatably mounted in a sleeve 68 which is fixed to a vertical shaft or rod 70 which in turn is secured to the floor 16.

The chain 56 is maintained at a proper tension by means of a tension arm 72 which supports a rotatably idler sprocket 76 thereon. The sprocket 76 is pivotally urged into engagement with the chain for tightening the same by means of a tension spring 74.

Fixed beneath the forward portion of the frame 10 is a plate 80 which is substantially vertically extending. As shown in FIGURE 1, two L-shaped rake support members 78 are connected at their forward ends by universal joint 82 to the plate 80 for pivotal motion thereof. The horizontal legs of the L-shaped members 78 diverge in a rearward direction and the vertical legs extend downwardly and are connected to a horizontally extending frame member 90 of the rake frame 84. As shown in FIGURES 1 and 2, the rake frame is shaped like a parallelogram and comprises the two parallel sides 86, 92 and the two parallel sides 88, 90. The side frame members 186 and 92 slope forwardly and upwardly from the rear frame member 90. And a forward frame 88 is secured to the upper legs to the L-shaped frame member 78.

For adjusting the elevation of the rake assembly, two hydraulically reciprocating motors 102 are mounted on the frame 12 by means of a U-shaped supports 104. The L-shaped toggle levers 96 are pivoted at 98 to brackets 100 which are riveted to the frame 10. The upper legs of the toggle levers are pivoted to the piston rods of the motors while the lower legs 96 are connected by a link 94 to the L-shaped members 78. While the connecting means of the ends of the links 94 comprise pivot pins.

The hydraulic motors 102 are connected by means of hydraulic lines 106 and control valve 108 to the hydraulic pressure pump 66.

Rotatably mounted on substantially the center point of the rake frame members 86 and 92 are two star-shaped members 110 and 112. These star-shaped members lie in substantially parallel planes and each have five points. Each adjacent point of the star members are pivotally connected to substantially horizontally extending rake rods 114. Each rake rod has a multiplicity of parallel rake points 116 normally extending therefrom. As shown in FIGURE 2, the left star member 112 is drivingly connected to the rear wheel 32' by means of a gear box 118 fixed to the frame member 92, the drive shaft 122 and the universal joints 120 and 124.

The front portion of the rotating rake assembly is protected and enclosed by a semi-cylindrical cage member composed of semi-circular rod members 126 whose ends are bolted to the rake frame members 90 and 88.

Pivotally mounted on the central rear portion of the floor 16 is a seat 128 pivotally connected to the bracket 134 on the floor by means of posts 130 and brace 132. The spring assembly 136 urges downwardly on the front end of the post 130 and thereby acts as a cushion or shock absorber for the seat 128.

Pivoted brake pedals 138 and 140 have their lower ends connected to flexible cables which extend through rigid pipes 142 and 144 to conventional brake assemblies in the wheels 32 and 32'.

In operation, the driver of the machine disconnects the belt 40 by means of clutch pedal 44 and starts the engine. After the engine is started, the operator raises the rake assembly 140 a substantial distance above the ground by opening the hydraulic valve 108. This conduit fluid pressure from the pump 66 through lines 106 to hydraulic motors 102 which in turn lifts the rake assembly 130. After the operator drives the self-propelled rake to the area to be raked he lowers the rake assembly 140 to the ground by means of manipulating the valve 108. He then drives the machine back and forth across this area while the wheel 32' rotates the raking prongs 116 by means of the drive shaft 122 and gear box 118. Since the rake prongs 116 are moving diagonally in relation to the path of travel of the machine itself, the hay is thrown to one side of the machine where it forms windrows which may be conveniently formed into stacks or pitched into vehicles for transportation from the fields.

As viewed in FIGURE 2, the hay raking device will normally be rotating in a direction opposite to that of the wheels 32, 32' so as to propel the hay to the left for forming windrows.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-propelled rake device comprising a U-shaped frame having an elevated control portion supported on downwardly extending end portion, fore and aft wheels rotatably connected to the lower ends of said end portions, an operator's support on top of the frame including a platform, steering means connected to the fore wheels controllable from the operator's support, power means supported on top of the platform rotatably connected to at least one of said wheels, rake means supported on the frame and extending between said end portions below said platform and rotatable on a horizontal axis.

2. A self-propelled rake device comprising a frame supported on fore and aft wheels, an operator's support on the frame, steering means connected to the fore or aft wheels controllable from the operator's support, power means supported on the frame rotatably connected to at least one of said wheels, rake means supported on the frame and rotatable on a substantially horizontal axis inclined to the path of travel of the rake, and rotatable drive means directly connecting the rake means to the power means, drive means between the rear wheel and one end of the rotatable rake means, the last named drive means including a gear box on the rake frame connected by a shaft and universal joints to an end of the rear axle.

3. A device as defined in claim 2 including a flat platform and wherein the power means, operator's support, V-belt, pedal, transmission, pump and valve are all mounted on the flat platform which is secured to the top of the frame.

4. A device as defined in claim 1 wherein said rake means includes a rake rotatably mounted on a rake frame, the center of said rake located directly below said central portion of the U-shaped frame, a pair of arms secured to said rake frame and extending forwardly therefrom, the forward ends of said arms being pivotally connected to said U-shaped frame, a lift mechanism connected between said frames for raising and lowering said rake.

5. A device as defined in claim 4 wherein drive means is connected directly between the one power driven wheel and said rake for rotating same.

6. A device as defined in claim 5 wherein said lift mechanism is hydraulically operated, a pump mounted on said platform operatively connected to said lift mechanism, means drivingly connected to said lift mechanism, means drivingly connecting said power means to said pump and means drivingly connecting said pump to said power driven wheel.

References Cited in the file of this patent

UNITED STATES PATENTS

| | | |
|---|---|---|
| 2,573,971 | Hoefer | Nov. 6, 1951 |
| 2,577,264 | Oppegaard | Dec. 4, 1951 |
| 2,588,599 | Winter | Mar. 11, 1952 |
| 2,603,933 | Shore | July 22, 1952 |
| 2,847,814 | Weaver | Aug. 19, 1958 |
| 2,898,724 | Robinson | Aug. 11, 1959 |
| 2,929,187 | Boggio | Mar. 22, 1960 |
| 2,938,324 | Rosenberg | May 31, 1960 |